United States Patent [19]

Petrak

[11] Patent Number: 5,421,592
[45] Date of Patent: Jun. 6, 1995

[54] UNITIZED RADIAL AND FACIAL SEAL

[76] Inventor: Gregory H. Petrak, 16488 W. 55th Dr., Golden, Colo. 80403

[21] Appl. No.: 15,475

[22] Filed: Feb. 8, 1993

[51] Int. Cl.$^6$ .............................................. F16J 15/34
[52] U.S. Cl. ..................................... 277/38; 277/40; 277/47; 277/65; 277/178
[58] Field of Search ........................ 277/35, 38, 39, 40, 277/41, 47, 50, 51, 65, 93 R, 95, 178

[56] References Cited

U.S. PATENT DOCUMENTS

| | | | |
|---|---|---|---|
| 2,294,105 | 8/1942 | Wallgren | 308/36.1 |
| 2,479,968 | 8/1949 | Schick | 277/38 |
| 2,482,029 | 9/1949 | Reynolds | 286/5 |
| 2,498,739 | 2/1950 | Magnesen | 277/40 |
| 2,565,675 | 8/1951 | Bottomley et al. | 277/40 |
| 2,783,067 | 2/1957 | Foss | 277/11 |
| 2,868,562 | 1/1959 | Heimbuch | 288/3 |
| 3,311,430 | 3/1967 | Christensen et al. | 308/187.1 |
| 3,479,840 | 11/1969 | Meyers | 64/17 |
| 3,511,513 | 5/1970 | Dahlheimer | 277/65 |
| 3,582,091 | 6/1971 | Smith | 277/83 |
| 3,761,099 | 9/1973 | Hansson | 277/37 |
| 4,377,312 | 3/1983 | Zackrisson | 308/187.1 |
| 4,497,495 | 2/1985 | Christiansen | 277/50 |
| 4,502,698 | 3/1985 | Collins | 277/43 |
| 4,848,776 | 7/1989 | Winckler | 277/65 X |
| 4,861,172 | 8/1989 | Annast et al. | 384/477 |
| 4,943,068 | 7/1990 | Hatch et al. | 277/38 X |
| 5,018,750 | 5/1991 | Sparks et al. | 277/38 |
| 5,098,112 | 3/1992 | Petrak | 277/39 |
| 5,137,285 | 8/1992 | Pick | 277/47 |

FOREIGN PATENT DOCUMENTS

| | | | |
|---|---|---|---|
| 0124487 | 6/1947 | Australia | 277/93 R |
| 0016079 | 3/1956 | Germany | 277/93 R |
| 2216815 | 11/1972 | Germany | |
| 230697 | 3/1925 | United Kingdom | |
| 0807140 | 1/1959 | United Kingdom | 277/41 |

Primary Examiner—William A. Cuchlinski, Jr.
Assistant Examiner—John L. Beres
Attorney, Agent, or Firm—John E. Reilly

[57] ABSTRACT

A unitized radial and facial seal assembly intended for use between radially inner and outer relatively rotationally and axially movable members includes a counterface for securement to the radially inner member and a bearing fixed to the counterface for conjoint movement therewith. An axially compressible facial seal is captured between axially spaced, radially outwardly extending flanges of the counterface and the retainer to prevent entry of external contaminants. A radial seal is mounted on a casing fixed against relative rotational and axial movement while sealingly engaging the radially inner member. In an installed condition, the radial seal, casing, retainer, and facial seal are all fixed against relative rotational and axial movement to the radially outer member. The counterface and bearing are secured for conjoint rotation with the radially inner member. The seal components form a secondary labyrinth seal to prevent any contaminants which do pass by the facial seal from reaching the radial seal. In a first embodiment, the casing is press-fit within the retainer, which, in turn, is press-fit within a counterbore of the radially outer member during installation. In a second embodiment, the casing includes an overfolded skirt portion surrounding the retainer and press-fit into the counterbore during installation.

17 Claims, 2 Drawing Sheets

UNITIZED RADIAL AND FACIAL SEAL

BACKGROUND OF THE INVENTION

The present invention relates to seals, and more particularly pertains to a unitized radial and facial seal intended principally for use between radially inner and outer relatively rotationally and axially movable members.

There are numerous applications in which relatively rotating members require a seal or seals to retain lubricant and exclude contaminants. Sealing a shaft in a contaminated environment while the shaft is simultaneously rotating and undergoing axial reciprocation represents a very difficult sealing problem. Conventional rotary shaft seal designs include lips intended to run on a very thin surface lubricant film on a rotating shaft. Failure or absence of the lubricant film results in high friction and attendant rapid wear of the sealing lip. Accordingly, in a rotating application, the force used to bias the sealing lip against the shaft should not therefore be so great as to cause the seal lip to break through the lubricant barrier which "wets" or adheres to the shaft surface. Due to the relatively low seal-to-shaft bias force, a seal designed to operate in a rotary application will fail in an axial reciprocating application because lubricating oil will bypass the sealing lip as the shaft moves axially. When the shaft moves to an axially extended position, contaminants will collect on the surface of the shaft. Subsequently axial retraction of the shaft tends to force the collected contaminants into the seal lip. The very fine and typically abrasive contaminant particles will pass under the seal lip because the seal-to-shaft bias force is not sufficient to break through the lubricant film. The contaminant particles will abrade both the sealing lip and the shaft and over time the shaft will become scored, resulting in lubricant leakage.

For these reasons, it is desirable in simultaneous rotational and axially reciprocating shaft applications to provide for a facial sealing lip to exclude contaminants and prevent such contaminants from coming into contact with the radial sealing lip. Wide linear manufacturing and assembly tolerances can, however, cause difficulty in determining the exact linear position on a shaft for installation of a facial seal to ensure positive, uniform contact between the facial seal and a mating surface to be sealed.

SUMMARY OF THE INVENTION

It is therefore an object of the present invention to provide for a novel and improved radial and facial seal capable of accommodating a wide range of manufacturing and assembly tolerances.

Another object of the present invention is to provide for a novel and improved unitized radial and facial seal including a secondary labyrinth seal for preventing external contaminants which breach the facial seal from reaching the radial seal.

It is a further object of the present invention to provide for a novel and improved unitized radial and facial seal assembly for use between radially inner and outer rotationally and axially relatively moveable members.

In accordance with the present invention, a seal assembly has been devised for installation between radially inner and outer relatively rotationally and axially movable members wherein a first annular seal member is mounted on one of the relatively movable members for sealing engagement with the other of the relatively movable members, the improvement comprising an annular counterface mounted on the other relatively movable member, retainer means disposed in fixed relation to the first annular seal member and said one of the movable members, and an axially compressible second annular seal member interposed between the retainer and counterface, the second annular seal member being maintained in sealed engagement and the counterface notwithstanding axial displacement between the movable members.

In the preferred form, the first annular seal member is a radial seal and the second annular seal member is a facial seal which together with the retainer means are fixed against rotational and axial movement relative to the outer movable member, while the counterface and a bearing are rotatable and axially displaceable with the inner movable member. Relative axial movement between the radially inner and outer members compresses the facial seal between the counterface and retainer flanges, while still maintaining sealing engagement. The seal components form a secondary labyrinth to discourage any contaminants which breach the facial seal from reaching the radial seal. In a first embodiment of the invention, the radial seal is mounted on a casing is press-fit within the retainer, the latter press-fit within a counterbore of the radially outer member during installation of the seal assembly. In a second embodiment of the invention, the casing includes an overfolded skirt portion surrounding the retainer and fixed to the radially outer member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
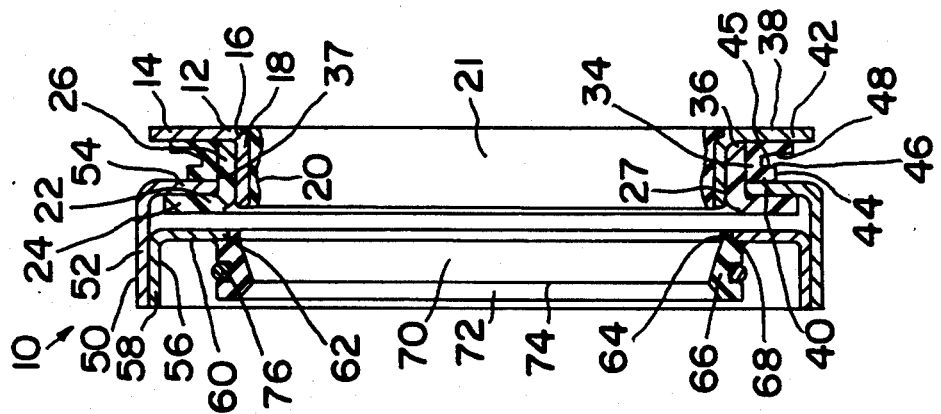
FIG. 1 is a longitudinal cross sectional view of an unitized radial and facial seal according to a first embodiment of the present invention.

Referring now to the drawings, wherein like reference numerals designate corresponding structure throughout the views, and referring in particular to FIG. 1, a unitized radial and facial seal assembly 10 according to a first preferred embodiment of the invention includes six major components: a counterface 12, a bearing 22, a facial seal 34, a retainer 50, a casing 56, and a radial seal 66. The seal assembly 10 is of a generally cylindrical and symmetrical shape, with FIG. 1 illustrating a representative longitudinal cross sectional view taken along a diametrical plane of symmetry.

The counterface 12, preferably formed from a metal material, includes a radially extending annular flange 14 connected by a ninety-degree radius bend 16 to an axially extending cylindrical wall portion 18 which forms a central circular aperture 21. A molded rubber coating 20 on interior surfaces of wall portion 18 and bend 16 facilitates installation of the counter face 12 in surrounding press-fit relation to a cylindrical shaft S and ensures tight-fitting sealed engagement.

Figure 2:
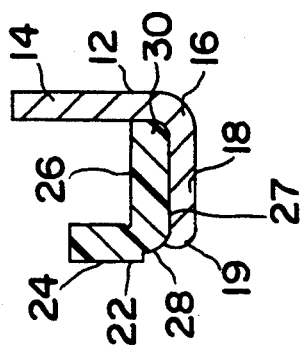
FIG. 2 is an enlarged partial cross-sectional detail view illustrating bearing and counterface components of the unitized radial and facial seal of FIG. 1.

With reference to FIGS. 1 and 2, a bearing 22, preferably formed from a substantially rigid, self-lubricating plastic or similar material, includes a radially extending annular flange 24 connected by a ninety-degree radius bend 28 to an axially extending cylindrical wall portion 26 having an inner radial surface 27 dimensioned to allow snap-fit insertion of the cylindrical wall portion 18 of counterface 12. As shown in detail in FIG. 2, an axially outer end 30 of the cylindrical wall portion 18 of bearing 22 is given a curvature dimensioned for conforming engagement with an external surface of the radius bend portion 16 of the counterface 12. During assembly, after insertion of the cylindrical wall portion 18 of the counterface 12 through the central circular aperture 27 of the bearing 22, a crimping operation outwardly flares an axially inner end 19 of the cylindrical wall portion 18 slightly over the radius bend 28 of the bearing 22, thus securing the counterface 12 and bearing 22 against relative rotational and axial displacement.

As depicted in FIG. 1, an annular facial seal 34, preferably composed of an elastomeric material, includes an internal cylindrical wall 36 having a radially inner surface 37 dimensioned to slip-fit over the cylindical portion 26 of the bearing 22. The seal is of generally U-shaped cross-sectional configuration including axially spaced body portions 42 and 44 separated by a groove 45, the seal 34 preferably being disposed in inner spaced concentric relation to the housing H to be described. An interior undercut annular face 46 of the portion 44 defines an axially inner extent of the groove 45, while a radially and axially outwardly tapering surface 48 of the portion 42 defines an opposite extent of the groove 45. The portion 42 is of a slightly greater diameter than the portion 44 and defines an annular seal lip having an axially outer radial annular face 38 in surface engagement with an axially inner surface of the radial flange 14 of the counterface 12. The portion 44 has an axially inner radial annular face 40 which is molded or otherwise firmly attached to an axially outer face of a radially inwardly extending flange portion 54 of the retainer 50 so that the seal 34 is constrained against axial and rotational movement with the counterface 12 and bearing 22. The seal 34 is pre-loaded or mounted under compression between the retainer 50 and the flange 14, as illustrated in FIG. 3, so that it is free to expand in following the axial displacement of the counterface 12, as illustrated in FIG. 3A, and in particular such that the tapered seal lip of the portion 42 will remain in positive, uniform engagement with the flange 14 notwithstanding rotational and axial movement of the counterface 12 relative to the retainer 50.

The retainer 50, preferably composed of a metal material, includes an axially extending sleeve portion 52 defining a cylindrical cup-shaped recess receiving a casing 56 in press-fit relation therein. The casing 56 formed of metal includes a cylindrical portion 58 terminating at an axially outer end in a radially inwardly extending annular flange 60 bounding a central circular aperture 62. Cylindrical ledge 64 and annular shoulder 68 of a radial seal 66 function to position the seal 66 in coaxial relation to the aperture 62 of the casing 58. The annular radial seal 66 includes oppositely tapering frustoconical surfaces 70 and 72 intersecting at a minimum diameter circular ridge or seal lip 74 adapted to ride on a lubricant film on the surface of a rotating cylindrical shaft S. A circumferential garter spring 76 maintains a predetermined seal-to-shaft bias force of the radial seal 66 against the shaft S. Overlying engagement of the bearing flange 24 with the retainer flange 54 serves to maintain the counterface 12 and bearing 22 components in a unitized assembly with the remaining seal assembly components, while still permitting relative axial and rotational conjoint movement of the counterface 12 and bearing 22 with respect to the other seal components.

Figure 3:
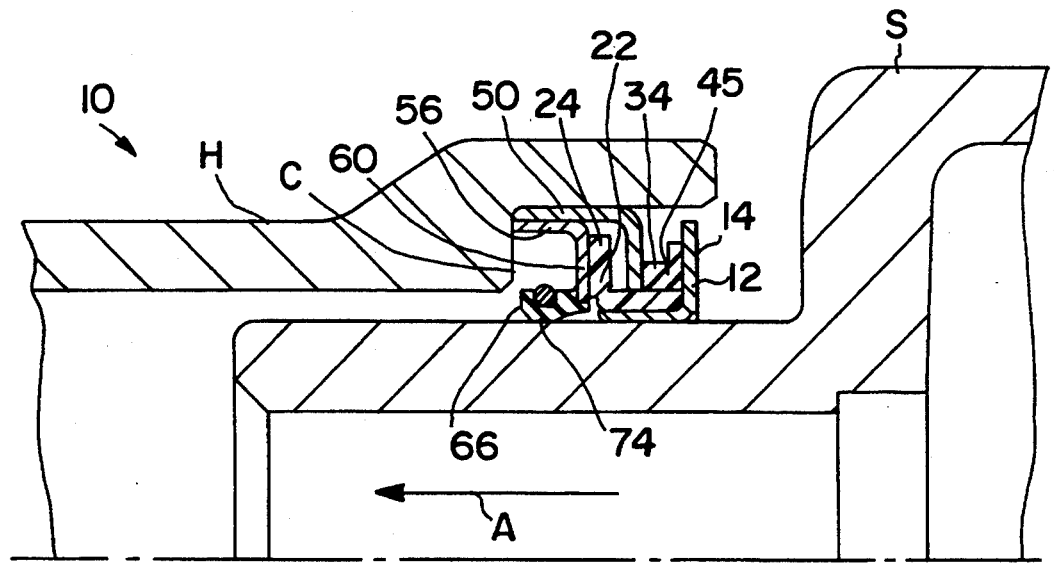
FIG. 3 is a longitudinal cross sectional view of the unitized radial and facial seal of FIG. 1 installed on a rotary and axially reciprocal shaft disposed in an axially retracted position.
Figure 3A:
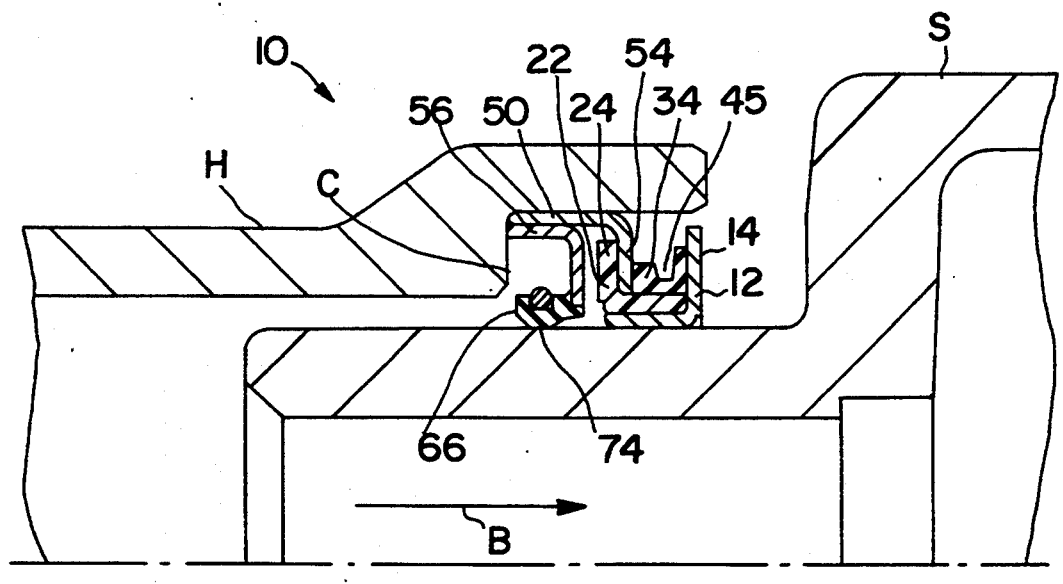
FIG. 3A is a longitudinal cross sectional view of the unitized radial and facial seal of FIG. 1 installed on a rotary and axially reciprocal shaft disposed in an axially extended position.

With reference to FIGS. 3 and 3A, a typical application and manner of operation of the seal assembly 10 will now be described. A stationary housing H, for example a differential trunnion of a vehicle, includes an elongated bore receiving a rotating and axially reciprocating shaft S in spaced surrounding relation. The shaft S may, for example, comprise a vehicle axle. The stationary housing H includes an enlarged diameter counterbore C formed coaxially with the shaft S. The outer diameter of the retainer 50 and inner diameter of the counterbore C are predetermined such that the retainer 50 is constrained against relative movement, both axial and rotary, to the housing H by virtue of a press-fit relationship. Accordingly, retainer 50, facial seal 34, casing 56, and radial seal 66 are all fixed against both axial and rotational movement relative to the housing H. Similarly, a press-fit engagement of shaft S within the central circular aperture 21, FIG. 1, of counterface 12 secures the counterface 12 and bearing 22 in axially spaced relation to the radial seal for conjoint rotational and axial movement with the shaft S. The facial seal 34 functions to prevent entry of external contaminants, while radial seal 66 functions to prevent lubricant leakage from housing H.

In an axially inward or retracted position of the shaft S depicted in FIG. 3, the shaft S has moved into the housing H in the direction indicated by arrow A, causing the flange 14 of counterface 12 to abut and axially compress the facial seal 34 thereby closing the groove 45. Simultaneously, flange 24 of bearing 22 moves into abutment with flange 60 of casing 56, defining an axially inward limit of movement of shaft S within the constraints imposed by the particular seal dimension parameters.

In FIG. 3A, the shaft S has moved partially out of the housing H in the direction indicated by arrow B, causing the flange 24 of the bearing 22 to move into abutment with the flange 54 of retainer 50, defining an axially outer limit of movement of the shaft S. Simultaneously, counterface flange 14 moves away from retainer flange 54, thus allowing facial seal 34 to decompress, opening groove 45, with the annular face 38 remaining in sealed engagement with the flange 14.

DETAILED DESCRIPTION OF MODIFIED FORM OF THE INVENTION

Figure 4:
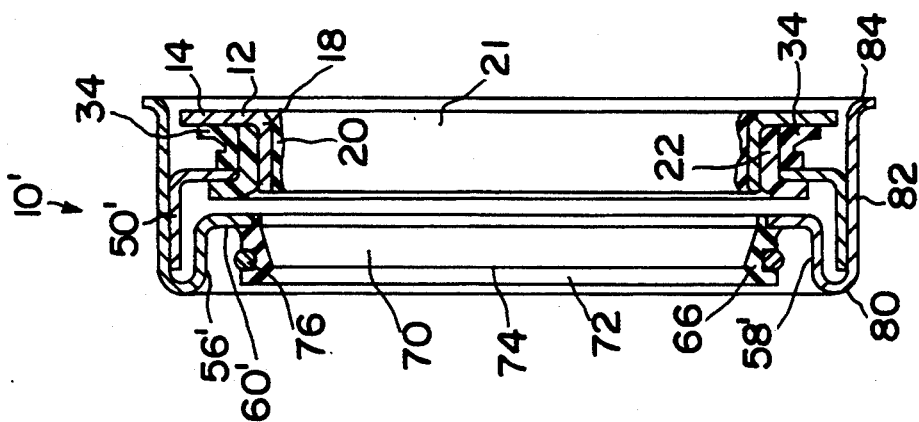
FIG. 4 is a longitudinal cross section view of an unitized radial and facial seal according to a second embodiment of the present invention.

FIG. 4 illustrates an alternative slightly modified embodiment 10' of a unitized radial and facial seal according to the invention wherein like elements to those of FIGS. 1, 2, 3, and 3A are correspondingly enumerated, and corresponding modified elements are designated by prime numerals. The seal assembly 10' is essentially similar in all respects to the embodiment illustrated and described with references to FIGS. 1, 2, 3, and 3A, with the following exceptions. The casing 56' of seal assembly 10' includes a generally cylindrical portion 58' terminating in an outwardly overfolded bend portion 80 connected to a cylindrical outer skirt 82. The skirt 82 terminates at an axially outer end in an outwardly flaring flange or rim 84. Thus, the casing skirt 82, rather than retainer 50 as in seal assembly 10, directly engages the counterbore C in press-fit relation. In the alternative embodiment 10' the retainer 50' is press-fit within the skirt 82.

In both embodiments 10 and 10' of the unitized radial and facial seal assembly according to the present invention, external contaminants must turn a ninety-degree corner around counterface flange 14 prior to reaching the facial seal 34, thus effectively reducing contaminant velocity prior to seal exposure. Additionally, rotation of the counterface 12 with the shaft S functions to sling or propel contaminants outwardly and away from the facial seal 34. Even in the event that any contaminants should penetrate facial seal 34, the remaining components of the seal assembly form an effective labyrinth seal forcing contaminants to follow a very torturous path before ever reaching the radial seal 66. It will be apparent from the preferred and modified forms of invention as herein set forth and described that a unitized seal assembly has been devised in which the facial seal 34 and radial seal 66 can be preassembled and installed as one piece or unit and compensate for any variations in manufacturing and assembly tolerances in the shaft S or housing H.

It is therefore to be understood that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed and reasonable equivalents thereof.

What is claimed is:

1. In a seal assembly for installation between radially inner and outer relatively rotationally and axially movable members wherein a first annular seal member is mounted on one of said relatively movable members for sealing engagement with the other of said relatively movable members, the improvement comprising:

an annular counterface mounted on said other relatively movable member in axially spaced relation to said first annular seal member;

a second annular seal member in spaced relation to said one of said movable members; and retainer means disposed in fixed relation to said first annular seal member and said one of said movable members for maintaining said second annular seal member in sealed engagement with said counterface notwithstanding relative rotational and axial movement between said movable members, and said counterface and said retainer means defining a circumferential groove therebetween for insertion of said second annular seal member therein.

2. In a seal assembly according to claim 1, said second annular seal member being of generally U-shaped cross-sectional configuration including a sealing lip in sealed engagement with said counterface.

3. In a seal assembly according to claim 1, wherein said retainer means includes a cylindrical, axially extending portion and an annular, radially extending flange portion.

4. In a seal assembly according to claim 3, wherein said counterface includes a bearing having a cylindrical axially extending portion and an annular, radially extending flange portion.

5. In a seal assembly according to claim 1, wherein said first annular seal member includes a casing having a cylindrical axially extending portion and an annular, radially extending flange portion.

6. In a seal assembly according to claim 5, wherein said casing is press-fit within said retainer means.

7. In a seal assembly according to claim 5, wherein said retainer means is press-fit within said casing.

8. In a seal assembly according to claim 1, wherein said retainer means is dimensioned for press-fit engagement with one of said relatively movable members.

9. In a seal assembly for installation between radially inner and outer relatively rotationally and axially movable members wherein an annularly extending radial seal member is mounted on one of said relatively movable members for sealing engagement with the other of said relatively movable members, the improvement comprising:

an annual counterface mounted on said other relatively movable member in axially spaced relation to said radial seal;

a bearing secured for conjoint rotational and axial movement with said counterface;

an axially compressible facial seal member extending annularly in surrounding relation to said bearing; and retainer means mounted on said one of said movable members whereby to support said facial seal in uniform circumferential contact with said counterface notwithstanding relative axial displacement between said movable members.

10. In a seal assembly according to claim 9, wherein said facial seal includes a circumferential groove which substantially closes upon axial compression of said facial seal.

11. In a seal assembly according to claim 9, wherein said facial seal includes smaller and larger diameter axially spaced, substantially cylindrical portions partially separated by a circumferential groove.

12. In a seal assembly according to claim 11, wherein said circumferential groove is bounded at one side by a radially and axially extending tapered surface.

13. In a seal assembly according to claim 9, wherein said counterface includes a first cylindrical wall portion and said bearing includes a second cylindrical wall portion, said first cylindrical wall portion disposed in coaxial relation within said second cylindrical wall portion, and one end of said first cylindrical wall portion flared outwardly to crimp said counterface to said bearing for conjoint axial and rotational movement therewith.

14. In a seal assembly according to claim 9, wherein said retainer means includes a first cylindrical wall portion and a first radial flange portion provided with a central circular aperture therethrough;

said bearing including a second cylindrical wall portion and a second radial flange portion; and said second cylindrical wall portion received through said central circular aperture and said first and second radial flanges disposed in at least partially overlying relation to retain said bearing in unitized assembled relation to said retainer means.

15. A radial and facial seal assembly for installation between radially inner and outer relatively rotationally and axially movable members, comprising:

first mounting means mounted in fixed relation to one of said relatively movable members and including a circumferential radial seal mounted thereon;

second mounting means mounted on said other relatively movable member and a bearing member;

a facial seal interposed between said first mounting means and said second mounting means in outer concentric relation to said bearing member; and retaining means disposed in fixed relation to said first mounting means for retaining said facial seal in direct sealed engagement with a radially extending surface portion of said second mounting means notwithstanding relative rotational and axial movement between said movable members.

16. In a seal assembly for installation between radially inner and outer relatively rotationally and axially movable members wherein an annular casing is mounted on an outer of said relatively movable members, said casing including a circumferential radial seal dimensioned for sealing engagement with an inner of said relatively movable members, the improvement comprising:

an annular counterface mounted on said inner relatively movable member, said counterface including a first cylindrical wall portion and a first radial flange portion;

a bearing secured for conjoint rotational and axial movement with said counterface, said bearing including a second cylindrical wall portion and a second radial flange portion, said second cylindrical wall portion disposed in coaxial surrounding relation to said first cylindrical wall portion and said first and second radial flanges disposed in axially spaced relation to one another;

retainer means including a third cylindrical wall portion and a third radial flange portion, said third radial flange portion at least partially overlying said second radial flange, said retainer means disposed in press-fit engagement with said casing;

an axially compressible annular facial seal disposed on said third radial flange portion and in sealing engagement with said first radial flange portion whereby said retainer means retains said facial seal in sealed engagement to said first radial flange portion notwithstanding rotational and axial movement of said counterface and bearing relative to said casing.

17. In a seal assembly according to claim 16, said facial seal mounted under compression between said third radial flange portion and said first radial flange portion.

* * * * *